(12) United States Patent
Loprieno et al.

(10) Patent No.: US 8,325,719 B1
(45) Date of Patent: Dec. 4, 2012

(54) LOW LATENCY MULTIPLEXING OVER TIME DIVISION MULTIPLEXING NETWORKS

(75) Inventors: Gilberto Loprieno, Milan (IT); Giacomo Losio, Tortona (IT)

(73) Assignee: Cisco Technology, Inc., San Jose, CA (US)

( * ) Notice: Subject to any disclaimer, the term of this patent is extended or adjusted under 35 U.S.C. 154(b) by 879 days.

(21) Appl. No.: 12/140,777

(22) Filed: Jun. 17, 2008

(51) Int. Cl.
*H04J 3/16* (2006.01)
(52) U.S. Cl. .................................. 370/389; 370/474
(58) Field of Classification Search .................. None
See application file for complete search history.

(56) References Cited

U.S. PATENT DOCUMENTS

| | | | |
|---|---|---|---|
| 7,042,904 B2 | 5/2006 | Kamiya | |
| 7,848,653 B2 * | 12/2010 | Zou | 398/72 |
| 2002/0083190 A1 | 6/2002 | Kamiya et al. | |
| 2003/0093607 A1 * | 5/2003 | Main et al. | 710/306 |
| 2003/0112833 A1 * | 6/2003 | Kamiya | 370/535 |
| 2006/0092943 A1 * | 5/2006 | Sundaram et al. | 370/394 |
| 2007/0091896 A1 | 4/2007 | Liu | |
| 2007/0116046 A1 | 5/2007 | Liu et al. | |
| 2007/0195832 A1 | 8/2007 | Liu | |
| 2007/0230495 A1 | 10/2007 | Li | |
| 2008/0037581 A1 * | 2/2008 | Asano | 370/466 |

OTHER PUBLICATIONS

"ESCON", Enterprise Systems Connection, Webopedia Computer Dictionary, 1-3.

Qureshi, Hussain et al., "Generic Framing Procedure, ITU-T G.7041 White Paper", Agilent Technologies, Electronic Products Solutions Group, Telecommunications Networks Test Division, Scotland, (Jul. 23, 2002), 1-12.

"ESCON", Enterprise Systems Connection, Wikipedia.com, (Apr. 18, 2008), 1.

"Enterprise Systems Connection (ESCON) Implementation Guide", IBM/International Technical Support Organization, New York, (Jul. 1996), 1-280.

"ITU-T, Telecommunication Standardization Sector of ITU, G.7041N.1303", Series G: Transmission Systems and Media, Digital Systems and Networks; Series Y: Global Information Infrastructure and Internet Protocol Aspects, Internet Protocol Aspects—Transport; Generic Framing Procedure (GFP), (Dec. 2001), 1-53.

"Generic Framing Procedure", www.wikipedia.com, 1-2.

Scholten, Mike et al., "Data Transport Applications Using GFP", Emerging Data Over Sonet/SDH (DoS) Standards and Technology, IEEE Communications Magazine, (May 2002), 1-8.

"Synchronous Optical Networking", www.wikipedia.com, 1-11.

* cited by examiner

*Primary Examiner* — Gregory Sefcheck
*Assistant Examiner* — Steve Young

(57) ABSTRACT

An apparatus may include a plurality of queues, wherein each queue is configured to receive a respective data stream. The apparatus may also include a multiplexer configured to time division multiplex the data streams into a combined data stream and a Generic Framing Procedure-Transparent (GFP-T) frame constructor configured to create a GFP-T frame. The GFP-T frame may include a payload portion. The payload portion may include a payload data portion including a sub-section of the combined data stream, and a payload header portion indicating the occurrence of a data stream signal failure. The apparatus may also include a transmitter configured to transmit the GFP-T frame via an optical link.

16 Claims, 8 Drawing Sheets

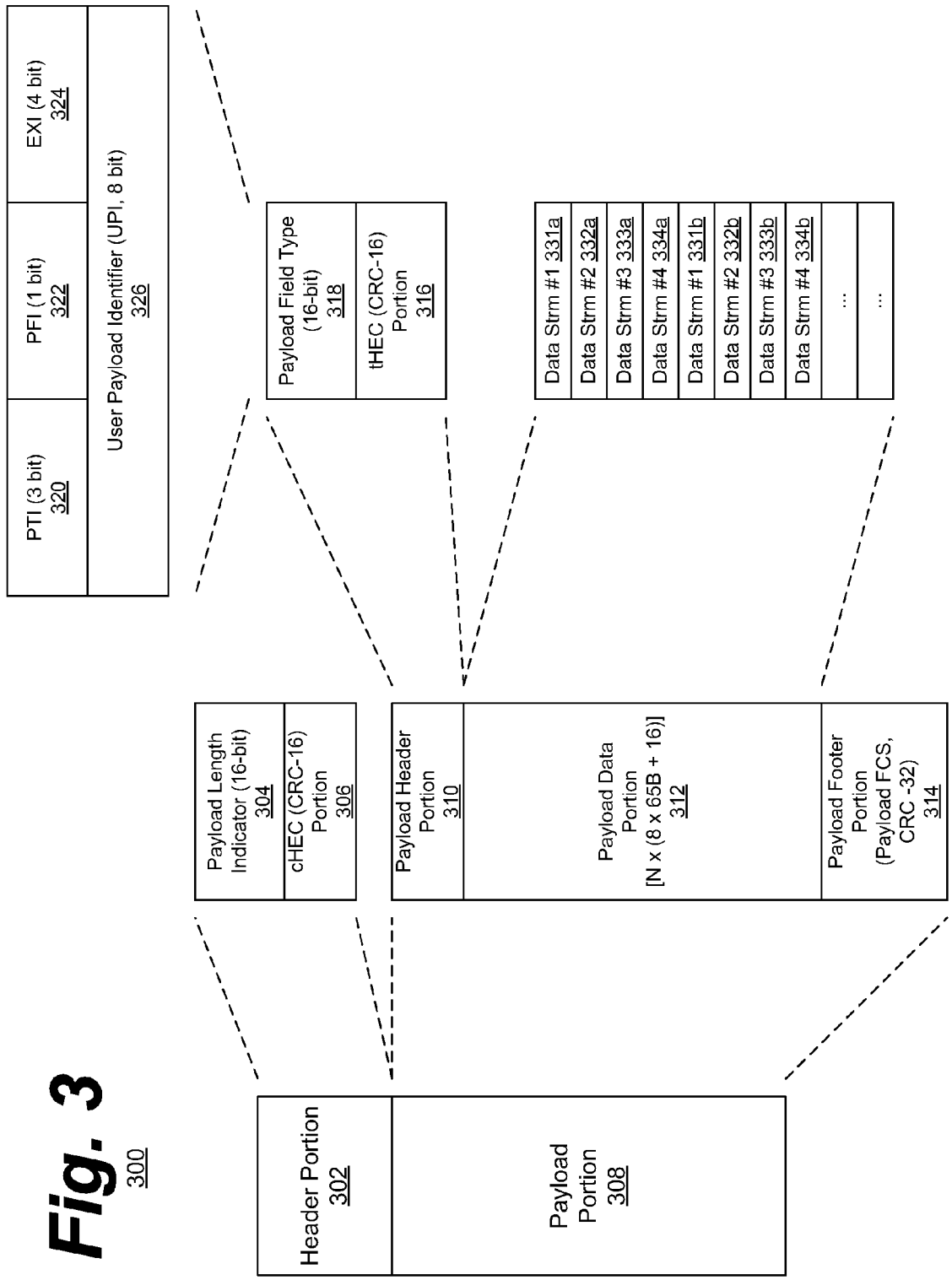

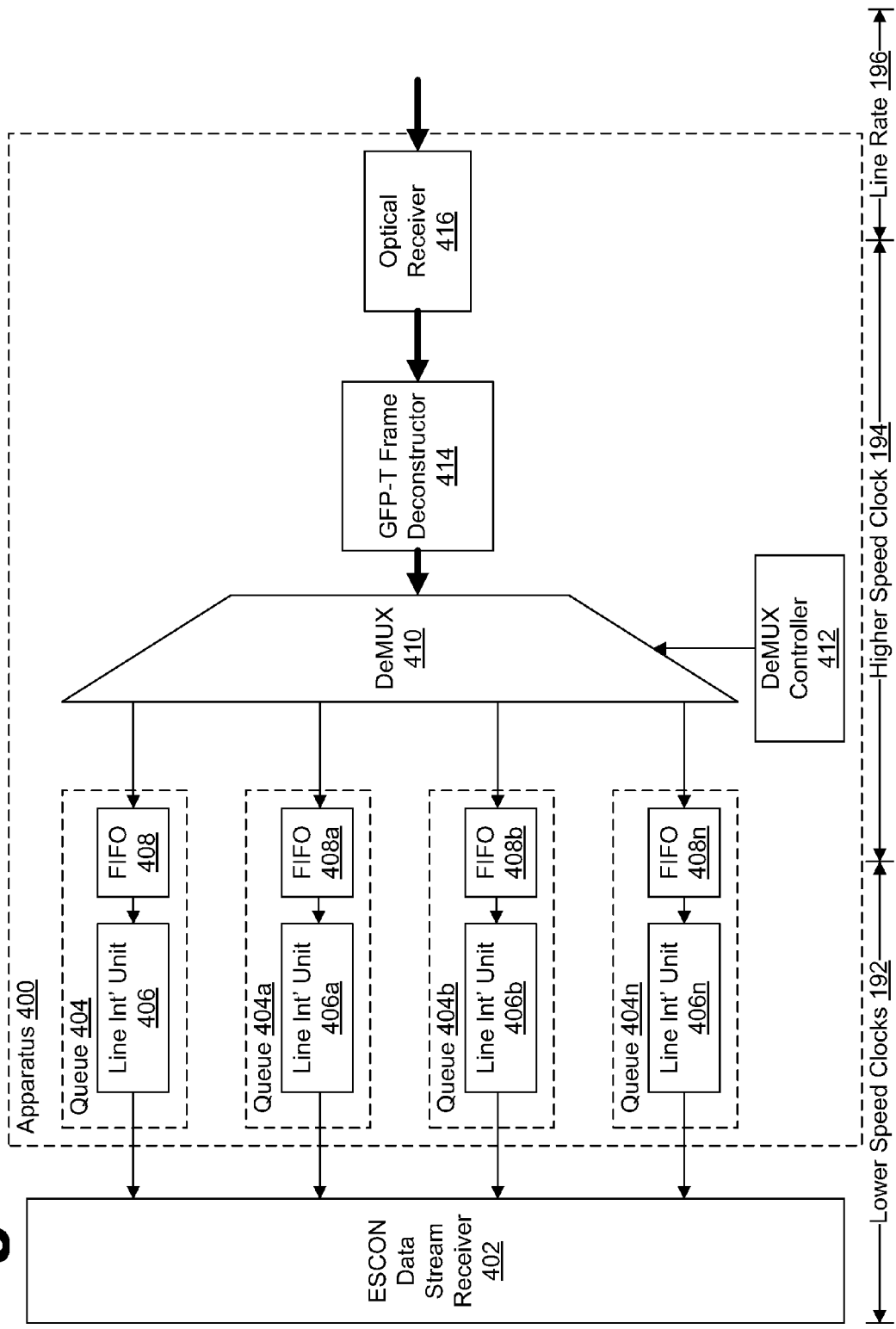

FIG. 5a
500

Start

502 Receiving a plurality of data streams

504 Wherein each data stream is synchronized to a respective clock having a substantially equivalent frequency

506 Receiving a plurality of Enterprise Systems Connection (ESCON) data streams

508 Receiving data streams from a plurality of different devices

510 Receiving a stream of data

512 Performing a 8B/10B decoding on the received data

514 Performing a Cyclic Redundancy Check (CRC) on the received data

516 Placing the data in a First-In-First-Out (FIFO) queue

518 Clock rate compensating the plurality of data streams to a common clock

520 Synchronizing the plurality of data streams to a common clock by either adding or deleting idle characters to the streams

522 Wherein the common clock includes a frequency substantially equivalent to the data stream clocks

524 Time division multiplexing the plurality of data streams to create a payload portion of a Generic Framing Procedure – Transparent (GFP-T) frame

526 Wherein the GFP-T frame includes a payload portion having a payload header portion and a payload data portion

528 Creating a GFP-T frame

530 Creating a 64-byte payload data portion

532 Wherein the plurality of data streams includes 4 data streams

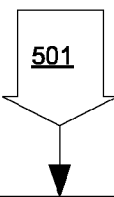

524 Time division multiplexing the plurality of data streams to create a payload portion of a Generic Framing Procedure – Transparent (GFP-T) frame 550 Dividing the GFP-T frame payload data portion into equal subdivisions based upon the number of data streams 552 Allocating 16 bytes of the payload data portion to each of the four data streams 554 Removing a portion of data from each data stream in a round robin fashion 556 Byte-wise interleaving the removed portions of the data streams into the payload data portion 558 Interleaving the removed data such that each data stream is represented in the payload data portion every fourth byte 560 Placing the GFP-T frame in a buffer for transmission 562 Editing the payload header portion to indicate an occurrence, or lack thereof, of a data stream signal failure 564 Detecting the occurrence of a client signal failure that includes either a loss of synchronization with a data stream, a loss of signal with a data stream, or both 566 Dividing a user payload identifier (UPI) field of the payload header portion into two bits per data stream 568 Wherein one of the two bits represents the loss of synchronization with the respective data stream, and the other bit represents a loss of signal with the respective data stream 570 Transmitting the GFP-T frame via an optical link End

FIG. 6a
600

↓

602 Receiving, via an optical link, a Generic Framing Procedure – Transparent (GFP-T) frame that includes a plurality of byte-wise interleaved data streams

↓

604 Decoding the received GFP-T frame into a combined data stream that includes the plurality of byte-wise interleaved data streams 606 Extracting a payload portion from the GFP-T frame

↓

608 Performing a error check on at least the payload portion

↓

610 Performing 64B/65B decoding on at least part of the payload portion

↓

612 Extracting, from the GFP-T frame, indications of data stream signal failure

614 Extracting a user payload identifier (UPI) from the GFP-T frame

616 Wherein the UPI is divided into two bits per data stream, and one of the two bits indicates a loss of the respective data stream signal and the other bit indicates a loss of the respective data stream character synchronization

↓

601

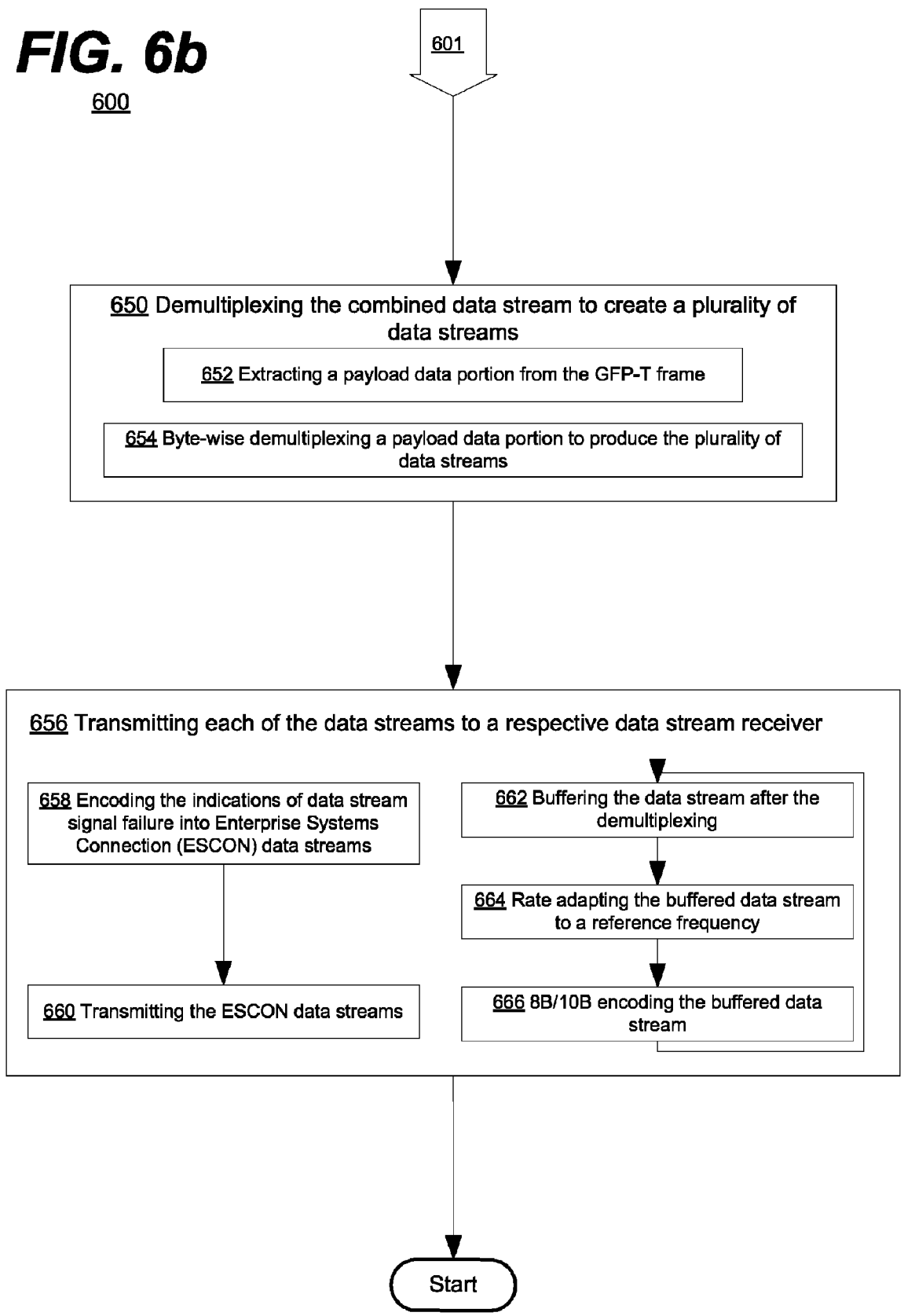

LOW LATENCY MULTIPLEXING OVER TIME DIVISION MULTIPLEXING NETWORKS

TECHNICAL FIELD

This description relates to the transmission and receipt of data via optical equipment, and more specifically to the multiplexing of data streams over optical networks.

BACKGROUND

Enterprise Systems Connection (ESCON) is generally a fiber optic connection technology that interconnects mainframe computers, workstations and network-attached storage (NAS) devices across a single channel. Typically, ESCON is capable of communication at a rate of 18.6 MB/second over distances of up to 8 kilometers. ESCON was introduced by IBM in 1990 to replace the older, slower, copper-based Bus & Tag channel technology of 1960-1990 era mainframes.

Synchronous optical networking (SONET) and Synchronous Digital Hierarchy (SDH), are generally two closely related multiplexing protocols for transferring multiple digital bit streams using lasers or light-emitting diodes (LEDs) over the same optical fiber. SONET and SDH are typically characterized as pure time division multiplexing (TDM) protocols, offering permanent connections, and do not involve packet mode communication. They are often considered to be physical layer protocols.

BRIEF DESCRIPTION OF THE DRAWINGS

FIG. 3 is a block diagram of an embodiment of a system for the transmission and receipt of data via optical equipment in accordance with an example embodiment of the disclosed subject matter.

FIG. 4 is a block diagram of an embodiment of a system for the transmission and receipt of data via optical equipment in accordance with an example embodiment of the disclosed subject matter.

FIG. 5 is a flow chart of an embodiment of a technique for the transmission and receipt of data via optical equipment in accordance with an example embodiment of the disclosed subject matter.

FIG. 6 is a flow chart of an embodiment of a technique for the transmission and receipt of data via optical equipment in accordance with an example embodiment of the disclosed subject matter.

DESCRIPTION OF EXAMPLE EMBODIMENTS

Overview

Figure 1:
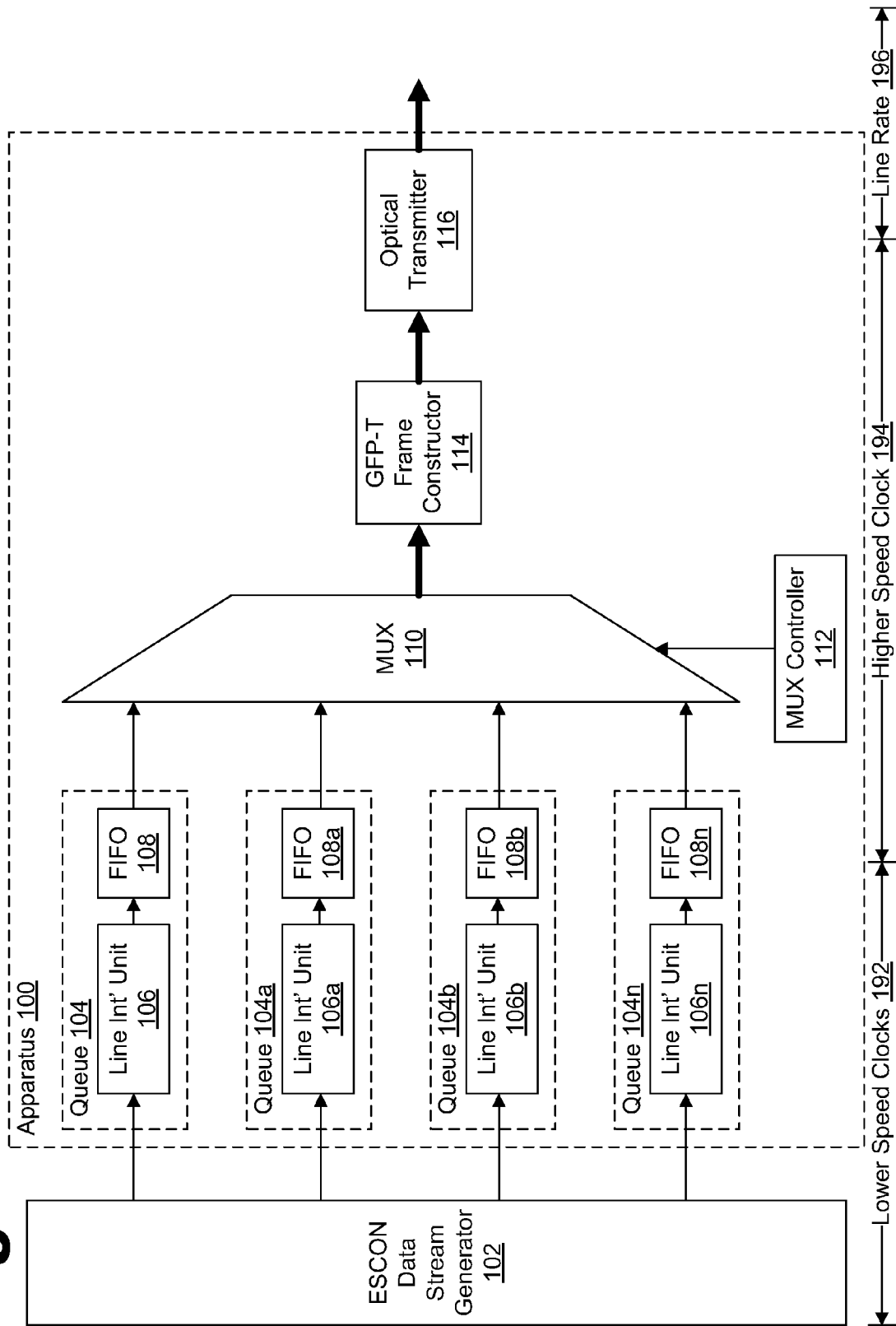
FIG. 1 is a block diagram of an embodiment of a system for the transmission and receipt of data via optical equipment in accordance with an example embodiment of the disclosed subject matter.

A system and/or method for the processing of data used in the optical communication of information, is substantially as shown in and/or described in connection with at least one of the figures, as set forth more completely in the claims.

According to an example embodiment, an apparatus may include a plurality of queues, wherein each queue is configured to receive a respective data stream. The apparatus may also include a multiplexer configured to time division multiplex the data streams into a combined data stream, and a Generic Framing Procedure-Transparent (GFP-T) frame constructor configured to create a GFP-T frame. The GFP-T frame may include a payload portion. The payload portion may include a payload data portion may which includes a subsection of the combined data stream, and a payload header portion indicating the occurrence of a data stream signal failure. The apparatus may also include a transmitter configured to transmit the GFP-T frame via an optical link. According to another example embodiment, a method may include receiving a plurality of data streams, wherein each data stream is synchronized to a respective clock having a substantially equivalent frequency, clock rate compensating the plurality of data streams to a common clock, time division multiplexing the plurality of data streams to create a payload portion of a Generic Framing Procedure-Transparent (GFP-T) frame, wherein the GFP-T frame includes a payload portion having a payload header portion and a payload data portion, editing the payload header portion to indicate an occurrence, or lack thereof, of a data stream signal failure, and transmitting the GFP-T frame via an optical link.

According to another example embodiment, a method may include receiving, via an optical link, a Generic Framing Procedure-Transparent (GFP-T) frame that includes a plurality of byte-wise interleaved data streams, decoding the received GFP-T frame into a combined data stream that includes the plurality of byte-wise interleaved data streams, extracting, from the GFP-T frame, indications of data stream signal failure, demultiplexing the combined data stream to create a plurality of data streams, and transmitting each of the data streams to a respective data stream receiver.

According to yet another example embodiment, an apparatus may include an optical receiver configured to receive a Generic Framing Procedure-Transparent (GFP-T) frame that includes a plurality of byte-wise interleaved data streams, a Generic Framing Procedure-Transparent (GFP-T) frame deconstructor configured to: extract a payload portion from the received GFP-T frame, wherein the payload portion includes a plurality of byte-wise interleaved data streams, and extract, from the GFP-T frame, indications of data stream signal failures, a demultiplexer configured to divide the payload portion into a plurality of data streams, and a plurality of queues configured to buffer and transmit the plurality of data streams.

Example Embodiments

FIG. 1 is a block diagram of an embodiment of a system or apparatus 100 for the transmission and receipt of data via optical equipment in accordance with an example embodiment of the disclosed subject matter. In one embodiment, the apparatus 100 may include a plurality of queues 104, a multiplexer (MUX) 110, and a generic framing procedure (GFP) frame constructor 114. In one embodiment, the apparatus 100 may include a multiplexer controller 112, and an optical transmitter 116.

In one embodiment, the queues 104 may be configured to receive a plurality of data streams. In various embodiments, these data streams may be ESCON streams from a variety of sources. In various embodiments, the data sources may be different clients or customers. For example, in one embodiment, two data streams may be generated by two different customers on different floors of the same building that houses the apparatus 100 and two other data streams may be generated by a single customer across town from the apparatus 100;

although, it is understood that the above is merely one illustrative example to which the disclosed subject matter is not limited. In some embodiments, the data streams may change origin, or stop and start during the operation of the apparatus 100. In FIG. 1, these sources are generally represented as ESCON Data Stream generator 102.

In various embodiments, these data streams may be received via Serializer/Deserializer (SerDes) links. In various embodiments, the data streams may include data stored in 8B10B encoding. In some embodiments, 8B10B encoding may include a telecommunications line code that maps 8-bit symbols to 10-bit symbols to achieve Direct Current (DC)-balance and bounded disparity, and provide enough state changes to allow reasonable clock recovery.

In various embodiments, each data stream may be synchronized to a respective clock. In various embodiments, each data stream may use a 20 MHz clock or data rate. In one embodiment, this clock rate (e.g., 20 MHz) may be referred to as the lower speed clock 192; wherein the term "lower" is in respect to the higher speed clock 104 and the line rate 196. In one embodiment, because the data streams are provided by a plurality of sources, the data streams may not be uniformly synchronized. For example, while the data streams may include a frequency of 20 MHz, they may transition asynchronously to one another.

Figure 2:
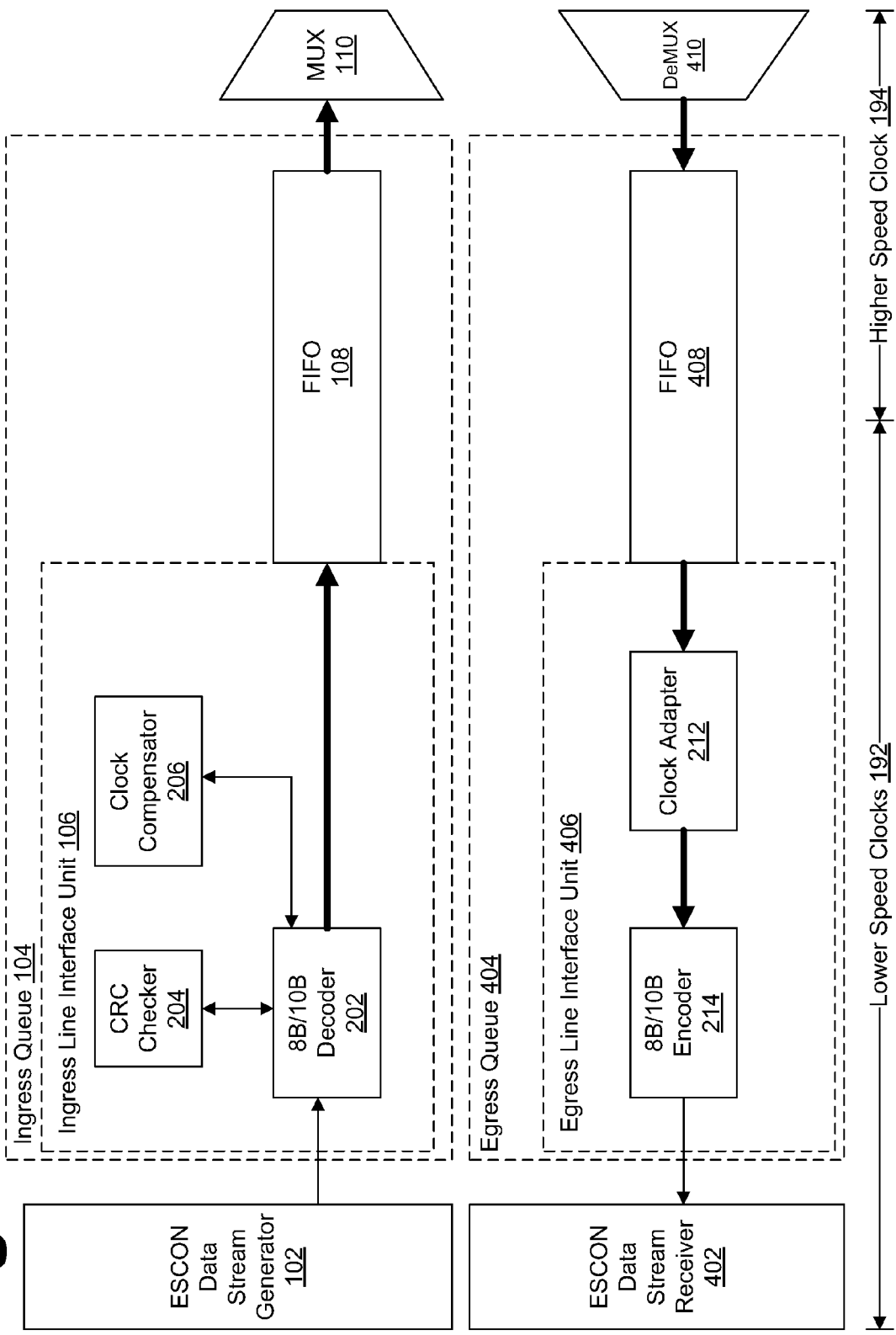
FIG. 2 is a block diagram of an embodiment of a system for the transmission and receipt of data via optical equipment in accordance with an example embodiment of the disclosed subject matter.

In one embodiment, each data stream may be received by a respective queue 104 and, for example, queues 104a, 104b, 104n. In various embodiments, each queue may include a line interface unit (LIU) 106 and a first-in-first-out (FIFO) queue 108 (also LIU 106a, 106b & 106n, and FIFO 108a, 108b & 108n). An embodiment of a LIU is illustrated in FIG. 2, as described below.

In one embodiment, the LIU 106 may be configured to perform an 8B/10B decoding of the received data. In one embodiment, the LIU 106 may also be configured to perform error checking on the received data. In various embodiments, the error checking may include performing a cyclic redundancy check (CRC) on the received data.

In one embodiment, the LIU 106 may also be configured to do performance monitoring. In one embodiment, the performance monitoring may include ESCON frame counting, 8B/10B coding violation or disparity counting, data type identification, etc.

In various embodiments, the monitoring may also include monitoring each data stream for proper signal reception and/or data synchronization. For example, in one embodiment, the connection between the data stream provider 102 and the apparatus 100 may be severed, or otherwise disrupted, and the data stream signal may be lost. In another embodiment, the data stream signal may be received but the data may no longer be synchronized properly, such that the received data is invalid. Either event may result in a data stream signal failure or error. Although, it is understood that the above are merely a few illustrative examples to which the disclosed subject matter is not limited.

In various embodiments, the LIU 106 may synchronize the plurality of data streams to a common clock. In such an embodiment, the plurality of data streams, after synchronization, may include both the same frequency and the same transition timing. In one embodiment, this common clock may include the lower speed clock 192. In such an embodiment, the lower speed clock 102 may be a 20 MHz clock. In various embodiments, the common clock may include a frequency substantially equivalent to the data streams clocks.

In another embodiment, the clock synchronization may also include rate adaptation. In various embodiments, the data streams may include a common rate within a tolerance. For example, if the rate tolerance is 5% the data streams may include a nominal or ideal frequency of 20 MHz but in actuality include rates, such as, 19 MHz, 21 MHZ, 20.5 MHz, etc. It is understood that clock tolerances are often specified in terms of parts per million (ppm), for example +−100 ppm, and that the above is merely a simplistic non-limiting illustrative example to which the disclosed subject matter is not limited. The rate adaptation may include normalizing all data streams to a common data rate (e.g., 20 MHz).

In one embodiment, the clock compensation may include adding or subtracting, as needed, idle characters or otherwise innocuous data to the data streams. In one embodiment, the data streams may include frames or packets of data. These idle characters may be added or deleted from between these frames. In such an embodiment, to allow for the dynamic adjustment of idle characters between frames of data in the data streams, a minimum of four idle characters may be expected between received frames.

In one embodiment, the queue 104 may also include a FIFO 108. In one embodiment, the LIU 104 may be configured to place the data stream in the FIFO 108. In various embodiments, the FIFO 108 may be configured to adapt the data to the higher or core clock speed 194. In such an embodiment, data may be placed into the FIFO at the lower clock speed 192 and removed at the higher clock speed 194. In one embodiment, the higher clock speed 194 may include a frequency of 106.25 MHz. In various embodiments, due to the MUX 110, data may be removed slowly enough to prevent buffer under-runs, despite being removed using the higher clock rate 194.

In one embodiment, the FIFO 108 may be configured to monitor the amount of data in the FIFO 108 and request or cause a change in the number of idle characters in the stored portion of the data stream. In various embodiments, such thresholds may include a low threshold (at which time idle characters are inserted) and high threshold (at which time idle characters may be removed). In various embodiments, a start threshold may exist that denotes when there is enough data in the FIFO 108 to allow for data to be removed. In one embodiment, this start threshold may be set to allow sufficient time to add or remove idle characters if a low or high threshold situation is subsequently detected.

In one embodiment, the apparatus 100 may also include a MUX 110. In one embodiment, MUX 110 may be configured to time division multiplex the data streams into a combined data stream. In one embodiment, the MUX 110 may be configured to remove a portion of the data from each queue in a round robin fashion. In various embodiments, the MUX 110 may interleave the removed data into a combined data stream. In some embodiments, the MUX 110 may be configured to interleave the data in a byte-wise fashion, such that every byte is from a different data stream than the byte immediately preceding and the byte immediately succeeding. In various embodiments, the MUX 110 may be controlled by the MUX controller 112.

In one specific embodiment, the apparatus 100 may receive four data streams. In such an embodiment, each data stream may be represented in the combined data stream every fourth byte. Such an embodiment is discussed in more detail below in reference to FIG. 3.

In one embodiment, the apparatus 100 may also include a GFP-T Frame constructor 114. In one embodiment, Generic Framing Procedure may allow the mapping of variable length, higher-layer client signals over a transport network like SONET. There are frequently two modes of GFP: Generic Framing Procedure-Framed (GFP-F) and Generic Framing Procedure-Transparent (GFP-T). In various embodiments, GFP-F may map each client frame into a single GFP frame. GFP-F is often used where the client signal is framed or packetized by the client protocol. In another embodiment, GFP-T may allow the mapping of multiple 8B/10B block-coded client data streams into an efficient 64B/65B block code for transport within a GFP frame. As described below in reference to FIG. 3, a GFP-T frame may include a header portion and a payload portion. The payload portion may include a payload data portion and a payload header portion.

In one embodiment, the GFP-T Frame constructor 114 may be configured to create a GFP-T frame comprising a portion of the combined data stream within the GFP-T payload data portion. In one embodiment, the GFP-T Frame constructor 114 may be configured to create a GFP-T frame that includes a payload header portion having an indication of the occurrence of a data stream signal failure, as described above. In one embodiment, the payload header portion may be organized as described below in reference to FIG. 3.

In one embodiment, the GFP-T frame constructor 114 may be configured to receive the combined data stream from the MUX 110. In various embodiments, the GFP-T frame constructor 114 may also be configured to encapsulate the combined data stream using a 64B/65B encoding scheme. In some embodiments, 64B/65B encoding may include a telecommunications line code that maps 64-bit symbols to 65-bit symbols to achieve Direct Current (DC)-balance and bounded disparity, and provide enough state changes to allow reasonable clock recovery. In various embodiments, the GFP-T frame constructor 114 may be configured to create a payload header portion indicating the occurrence, or lack thereof, of a stream signal failure.

In one embodiment, the apparatus 100 may include an optical transmitter 116. In one embodiment, the optical transmitter 116 may be configured to transmit the GFP-T frame via an optical link. In one embodiment, the optical link may include a link that makes use of the SONET protocol. In one embodiment, the GFP-T may be transmitted at a regular interval or period (e.g., once every 84 of the high speed clock 194 cycles). In various embodiments, the optical transmitter 116 may operate at a line rate (e.g., a SONET rate of 2.488 Gbit/sec). In some embodiments, the optical transmitter 116 may include an interface unit that converts electrical signals to optical signals.

FIG. 2 is a block diagram of an embodiment of a system or line interface units for the transmission and receipt of data via optical equipment in accordance with an example embodiment of the disclosed subject matter. In one embodiment, the queues may include an ingress line interface unit 106 and an egress line interface unit 406.

In one embodiment, the ingress queue 104 may include a LIU 106 and a FIFO 108. In one embodiment, the ingress LIU 106 may include a CRC checker 204, a clock compensator 206, and an 8B/10B decoder 202. In one embodiment, the 8B/10B decoder 202 may be configured to receive a data stream and decode the stream from the 8B/10B protocol or encoding scheme. In various embodiments, the 8B/10B may also be configured to monitor the performance factors of the data stream, as described above.

In one embodiment, the CRC checker 204 may be configured to perform error checking of the received data stream. In various embodiments, the error checking may include a cyclic redundancy check (CRC); however, in other embodiments, other error checking schemes may be used. In some embodiments, the CRC checker 204 may also be configured to do performance monitoring. In other embodiments, the CRC checker 204 may be configured to determine if the data stream signal is properly received. The CRC checker 204 may also be configured to determine if the data stream signal is properly synchronized.

In one embodiment, the clock compensator 206 may be configured to synchronize the received data stream to a common clock. In various embodiments, the clock compensator 206 may add or remove idle or innocuous characters from the received data stream, as described above.

In one embodiment, the ingress LIU 106 may be configured to place data into the FIFO 108. As described above, the FIFO 108 may accept data at a first slower rate (e.g., low speed clock 192) and remove the data at a second higher rate (e.g., higher speed clock 194). As described above, the MUX 110 may remove data from each FIFO 108 in a time division multiplexing fashion.

In one embodiment, the egress queue 404 may include an egress LIU 406 and a FIFO 408. In one embodiment, the egress queue 404 may be configured to transmit a data stream to the data stream receiver 402. In one embodiment, the queue 404 may receive a data stream from the demultiplexer 410.

In one embodiment, the FIFO 408 may be configured to store data in a first-in-first-out fashion. The FIFO may, in one embodiment, be configured to accept data at a second higher clock rate (e.g., the higher speed clock 194) and output data at a first lower rate (e.g., lower speed clock 192).

In one embodiment, the queue 404 may include a clock adapter 212. In one embodiment, the clock adapter 212 may be configured to adjust the rate the demultiplexed data stream by adding or removing innocuous or idle characters within the data stream, as described above. The queue 404 may also include, in one embodiment, a number of thresholds to help regulate the data stream rate. As described above, in one embodiment, the queue 404 may include a low threshold, below which idle character insertion occurs. In such an embodiment, the queue 404 may include a high threshold, above which idle character removal may occur. In various embodiments, the queue 404 may also include a start threshold, above which data may be removed from the queue, as described above.

In one embodiment, the queue 404 may include an 8B/10B encoder 202 configured to encode the demultiplexed data stream using the 8B/10B scheme. In various embodiments, other data encoding schemes may be used. In various embodiments, the LIU 406 may be configured to produce an ESCON formatted data stream.

FIG. 3 is a block diagram of an embodiment of a data frame 300 for the transmission and receipt of data via optical equipment in accordance with an example embodiment of the disclosed subject matter. In one embodiment, the data frame 300 may include a GFP-T frame. In various embodiments, the GFP-T frame may be created by the GFP-T frame constructor 114.

In one embodiment, the GFP-T frame may include a header portion 302 and a payload portion 308. In various embodiments, the payload portion 308 may include part of the combined data stream.

In one embodiment, the GFP-T frame header portion 302 may include a payload length indicator (PLI) 304. In one embodiment, the payload length indicator 304 may be configured to indicate the length of the payload. In a specific embodiment, the payload length indicator 304 may be 16-bits or 2 bytes. In one embodiment, the header portion 302 may include an error correction portion 306. In one embodiment, the error correction portion 306 may be configured to provide error correction for the PLI 304 section. In various embodiments, the error correction portion 306 may include a CRC value.

In one embodiment, the payload portion 308 may include a payload header portion 306 and a payload data portion 312. In various embodiments, the payload portion 308 may also include a payload footer portion 314.

In one embodiment, the payload data portion 312 may include the sub-portion of the combined data stream. In various embodiments, the payload data portion 312 may be equally divided by the number of data streams.

In a specific embodiment, the apparatus 100 of FIG. 1 may receive four data streams. The payload data portion 312 may include 64 bytes. In this embodiment, the 64 bytes of the payload data portion 312 may be divided into 16 bytes per data stream. The payload data portion 312 may then be byte-wise interleaved so that each data stream occurs once every fourth byte. For example, the payload data portion 312 may include, in 1 byte segments, data stream #1 331a, data stream #2 332a, data stream #3 333a, data stream #4 334a, and then data stream #1 331b, data stream #2 332b, data stream #3 333b, data stream #4 334b, and so on.

In some embodiments, the transmitter apparatus 100 of FIG. 1 and the receiver apparatus 400 of FIG. 4 may use a predetermined ordering sequence. For example, the first client or data stream may be placed first in the payload data portion 312, the second data stream second in the payload data portion 312, and so forth. In another embodiment, an adaptive or dynamically determined ordering sequence may be used. In such an embodiment, the transmitter apparatus 100 of FIG. 1 may communicate to the receiver apparatus 400 of FIG. 4 the proper ordering sequence.

In various embodiments, if a data stream does not include enough data to fully fill the data stream's allotment, the data stream's allotment may be padded with innocuous data. Although, it is understood that the above are merely a few illustrative examples to which the disclosed subject matter is not limited.

In one embodiment, the payload data portion 312 may be interleaved to minimize the latency experienced by any of the data streams. In various embodiments, the interleaving may be used with latency sensitive data streams. In such an embodiment, the data stream may include a protocol such as video signals transport. The interleaving may decrease the latency compared to other techniques in which the data streams are not interleaved but instead an entire GFP frame or payload data portion 312 is given over to a particular data stream.

In one embodiment, the payload header portion 310 may include an error correction portion 316 and a payload field type 318. In such an embodiment, the error correction portion 316 may be configured to provide error correction information for the payload field type 318. In one embodiment, the error correction portion 316 may include a CRC value.

In one embodiment, the payload field type 318 may include a payload type identifier (PTI) 320 configured to indicate the type of the payload (e.g., data or management information). In one embodiment, the payload field type 318 may include a payload frame check sequence (FCS) identifier (PFI) 322 configured to indicate the presence (or lack thereof) of a payload FCS (e.g., within the payload footer 314). In one embodiment, the payload field type 318 may include an extension header identifier (EXI) 324 configured to indicate the presence of an optional extension header and the type thereof.

In one embodiment, the payload field type 318 may include a user payload identifier (UPI) 326. In various embodiments, the UPI 326 may be configured to indicate the occurrence, or lack thereof, of a data stream signal error, as described above. In one embodiment, the UPI 326 may be encoded to indicate, for each data stream, a loss of signal error and a loss of data synchronization error. In various embodiments, the UPI 326 may be divided into two-bits for each data stream, wherein one bit indicates that loss of signal for the data stream, and the other bit indicates the loss of data synchronization from that stream.

For example, in one embodiment, the value "00" for a particular data stream may indicate that no error has occurred. The value "01" may indicate that the data stream has encountered a loss of the data stream's signal. The value "10" may indicate that the data stream has encountered a loss of data synchronization. And, the value "11" may indicate that the data stream has encountered both the loss of signal and a loss of data synchronization. In the specific embodiment involving four data streams, the UPI 326 may include eight bits, two per data stream. Although, it is understood that the above are merely a few illustrative examples to which the disclosed subject matter is not limited.

In one embodiment, the UPI 326 may include information regarding a plurality of data streams. In one embodiment, the UPI 326 may include additional bytes to the GFP payload header portion 310. In such an embodiment, one byte may be added for every four clients. In another embodiment, the information may be distributed among consecutives GFP frames, creating a "multiframe" structure. For example, in one embodiment, the 1 byte UPI 326 may be divided into two nibbles (i.e., two 4 bit portions). In such an embodiment, a first nibble may include a sequence number and the second nibble may include encode the error information regarding two of the data streams. In such a way, information regarding a plurality of data streams may be encoded.

In one embodiment, the payload portion 308 may also include a payload footer portion 314. In various embodiments, the payload footer portion 314 may include a payload frame check sequence (FCS). In various embodiments, the FCS may include a CRC code to aid in the correct error-free transmission of the payload.

FIG. 4 is a block diagram of an embodiment of a system and apparatus 400 for the transmission and receipt of data via optical equipment in accordance with an example embodiment of the disclosed subject matter. In one embodiment, the system may include a data stream receiver 402 and the apparatus 400. In various embodiments, the apparatus 400 may include a plurality of queues 404, a demultiplexer 410, and a GFP frame de-constructor 414. In some embodiments, the apparatus 400 may also include an optical receiver 416.

In one embodiment, the optical receiver 416 may be configured to receive a Generic Framing Procedure-Transparent (GFP-T) frame that includes a plurality of byte-wise interleaved data streams. In various embodiments, this GFP-T frame may be received using a protocol substantially complaint with the Synchronous optical networking (SONET) standard.

In one embodiment, the GFP-T frame deconstructor 414 may be configured to decode or deconstruct the received GFP-T frame. In various embodiments, the GFP-T frame deconstructor 414 may be configured to decode the received GFP-T frame into a combined data stream. In some embodiments, the combined data streams may include a plurality of byte-wise interleaved data streams.

In one embodiment, the GFP-T frame deconstructor 414 may be configured to de-scramble the received GFP-T frame. In various embodiments, the GFP-T frame deconstructor 414 may be configured to de-encapsulate the GFP-T frame and extract a payload portion. In such an embodiment, the GFP-T frame deconstructor 414 may be configured to perform error checking (e.g., CRC checking) on the payload portion of the GFP-T frame. In one embodiment, the GFP-T frame deconstructor 414 may be configured to perform 64B/65B decoding of the payload portion or a sub-portion thereof.

In one embodiment, the GFP-T frame deconstructor 414 may be configured to extract indications, or lack thereof, of data stream signal failure. In various embodiments, the data stream failures may include the loss of a data stream signal or loss of a data stream character synchronization, as described above.

In various embodiments, the GFP-T frame deconstructor 414 may be configured to extract the indications from a user payload identifier (UPI) sub-portion of the GFP-T payload portion, as described above. In such an embodiment, the UPI may be dividing into two-bit segments, with each segment associated with a data stream. As described above, a first bit may indicate, in one embodiment, the loss of the data stream signal. A second bit may indicate, in one embodiment, the loss of the data stream character synchronization.

In one embodiment, the demultiplexer (DeMUX) 410 may be configured to divide the combined data stream into a plurality of data streams. In various embodiments, the DeMUX 410 may divide the combined data stream using a time division multiplexing scheme. In some embodiments, the combined data stream may include byte-wise interleaved data streams, such that each byte belongs to a different data stream. These data streams may be arranged in a round robin fashion. For example, in one embodiment including four data streams, every fourth byte may belong to a particular data stream. In one embodiment, the DeMUX 410 may be configured to demultiplex the payload portion of the GFP-T frame. In various embodiments, the payload portion may be extracted by the GFP-T deconstructor 414. In one embodiment, the DeMUX 410 may be controlled by the DeMUX controller 412.

In one embodiment, the queue or egress queue 404 may be configured to store a data stream. In various embodiments, the queue 404 may also be configured to transit the data stream to a data stream receiver. Each of the plurality of queues (e.g., queues 404, 404a, 404b, and 404n) may each process or be responsible for one of the plurality of data streams produced by the DeMUX 410.

In one embodiment, the queue 404 may include an egress LIU 406 and a FIFO 408, as described above. In one embodiment, the FIFO 408 may be configured to buffer or store a portion of a data stream in a first-in-first-out fashion. In one embodiment, the FIFO 408 may accept data at a first clock rate (e.g., the higher speed clock 194 or 106.25 MHz), and output the data at a second clock rate that is slower than the first clock rate (e.g., the lower speed clock 192 or 20 MHz).

In one embodiment, the FIFO 408 or LIU 406 may be configured to provide rate adaptation to the data stream, as described above. In such an embodiment, the rate adaptation may include adding or removing innocuous or idle characters to reach a reference packet or data frequency, as described above.

In one embodiment, the LIU 406 may be configured to perform 8B/10B encoding of the data stream, as described above. In one embodiment, the LIU 406 may also be configured to encode the extracted indications (or lack thereof) of data stream signal failure into the data stream. In one embodiment, the LIU 406 may be configured to encode the data stream, or a portion thereof, into an ESCON packet. In such an embodiment, the indications may be encoded as performance monitoring flags within the ESCON packet.

In one embodiment, the queue 404 may transmit the data stream to data stream receiver 402. In another embodiment, the queue 104 may output the data stream to another unit or stage of the apparatus that eventually transmits the data stream to the data stream receiver 402. In various embodiments, the data stream receiver 402 may include a plurality of data stream receivers. In such an embodiment, the various receivers may be at different locations, as described above. In various embodiments, the ESCON data streams, or packets thereof, may be transmitted using the lower speed clock 192 (e.g., 20 MHz).

In one embodiment, the apparatus 100 of FIG. 1, and the apparatus 400 of FIG. 4 may be integrated in whole or part into a single apparatus.

FIG. 5 is a flow chart of an embodiment of a technique 500 for the transmission and receipt of data via optical equipment in accordance with an example embodiment of the disclosed subject matter. It is understood that FIGS. 5a and 5b represent a single flowchart illustrated on multiple pages and connected via the connector 501, here-before and here after the multiple pages will simply be referred to as FIG. 5.

Block 502 illustrates that, in one embodiment, a plurality of data streams may be received, as described above. Block 504 illustrates that, in one embodiment, each data stream may be synchronized to a respective clock having a substantially equivalent frequency, as described above. Block 506 illustrates that, in one embodiment, receiving may include receiving a plurality of Enterprise Systems Connection (ESCON) data streams, as described above. Block 508 illustrates that, in one embodiment, receiving may include receiving data streams from a plurality of different devices, as described above. In one embodiment, the queue 104 or apparatus 100 of FIG. 1 may perform these actions, as described above.

Block 510 illustrates that, in one embodiment, receiving may include for each data stream, receiving a stream of data, as described above. Block 512 illustrates that, in one embodiment, receiving may include for each data stream, performing a 8B/10B decoding on the received data, as described above. Block 514 illustrates that, in one embodiment, receiving may include for each data stream, performing a Cyclic Redundancy Check (CRC) on the received data, as described above. Block 516 illustrates that, in one embodiment, receiving may include for each data stream, placing the data in a First-In-First-Out (FIFO) queue, as described above. In one embodiment, the queue 104 of FIG. 2 or apparatus 100 of FIG. 1 may perform these actions, as described above.

Block 518 illustrates that, in one embodiment, clock rate compensating the plurality of data streams to a common clock may occur, as described above. Block 520 illustrates that, in one embodiment, clock rate compensating may include synchronizing the plurality of data streams to a common clock by either adding or deleting idle characters to the streams, as described above. Block 522 illustrates that, in one embodiment, the common clock may include a frequency substantially equivalent to the data stream clocks, as described above. In one embodiment, the queue 104 of FIG. 2 or apparatus 100 of FIG. 1 may perform these actions, as described above.

Block 524 illustrates that, in one embodiment, time division multiplexing the plurality of data streams to create a payload portion of a Generic Framing Procedure-Transparent (GFP-T) frame may occur, as described above. Block 526 illustrates that, in one embodiment, the GFP-T frame may include a payload portion having a payload header portion and a payload data portion, as described above. In one embodiment, the MUX 110, GFP-T Frame Constructor 114, or apparatus 100 of FIG. 1 may perform these actions, as described above.

Block 528 illustrates that, in one embodiment, time division multiplexing may include creating a GFP-T frame, as described above. Block 530 illustrates that, in one embodiment, creating may include creating a 64-byte payload data portion, as described above. Block 532 illustrates that, in one embodiment, creating may include an embodiment where there are four data streams, as described above. In one embodiment, the MUX 110, GFP-T Frame Constructor 114, or apparatus 100 of FIG. 1 may perform these actions, as described above.

Block 550 illustrates that, in one embodiment, time division multiplexing may include dividing the GFP-T frame payload data portion into equal subdivisions based upon the number of data streams, as described above. Block 552 illustrates that, in one embodiment, dividing may include allocating 16 bytes of the payload data portion to each of the four data streams, as described above. In one embodiment, the MUX 110, or apparatus 100 of FIG. 1 may perform these actions, as described above.

Block 554 illustrates that, in one embodiment, time division multiplexing may include removing a portion of data from each data stream in a round robin fashion, as described above. Block 556 illustrates that, in one embodiment, time division multiplexing may include byte-wise interleaving the removed portions of the data streams into the payload data portion, as described above. Block 558 illustrates that, in one embodiment, interleaving may include interleaving the removed data such that each data stream is represented in the payload data portion every fourth byte, as described above. Block 560 illustrates that, in one embodiment, time division multiplexing may include placing the GFP-T frame in a buffer for transmission, as described above. In one embodiment, the MUX 110, GFP-T Frame Constructor 114, or apparatus 100 of FIG. 1 may perform these actions, as described above.

Block 562 illustrates that, in one embodiment, editing the payload header portion to indicate an occurrence, or lack thereof, of a data stream signal failure may occur, as described above. Block 564 illustrates that, in one embodiment, editing may include detecting the occurrence of a client signal failure that includes either a loss of synchronization with a data stream, a loss of signal with a data stream, or both, as described above. Block 566 illustrates that, in one embodiment, editing may include dividing a user payload identifier (UPI) field of the payload header portion into two bits per data stream, as described above. Block 566 illustrates that, in one embodiment, one of the two bits represents the loss of synchronization with the respective data stream, and the other bit represents a loss of signal with the respective data stream, as described above. In one embodiment, the queue 104, GFP-T Frame Constructor 114, or apparatus 100 of FIG. 1 may perform these actions, as described above.

Block 570 illustrates that, in one embodiment, transmitting the GFP-T frame via an optical link may occur, as described above. In one embodiment, transmitting may include transmitting a data via or substantially compliant with the SONET standard, as described above. In one embodiment, the optical transmitter 116 or apparatus 100 of FIG. 1 may perform these actions, as described above.

FIG. 6 is a flow chart of an embodiment of a technique 600 for the transmission and receipt of data via optical equipment in accordance with an example embodiment of the disclosed subject matter. It is understood that FIGS. 6*a* and 6*b* represent a single flowchart illustrated on multiple pages and connected via the connector 601, here-before and here after the multiple pages will simply be referred to as FIG. 6.

Block 602 illustrates that, in one embodiment, 602 Receiving, via an optical link, a Generic Framing Procedure-Transparent (GFP-T) frame that includes a plurality of byte-wise interleaved data streams may occur, as described above. In one embodiment, the optical receiver 416 or apparatus 400 of FIG. 4 may perform the action, as described above.

Block 604 illustrates that, in one embodiment, decoding the received GFP-T frame into a combined data stream that includes the plurality of byte-wise interleaved data streams may occur, as described above. Block 606 illustrates that, in one embodiment, deciding may include extracting a payload portion from the GFP-T frame, as described above. Block 608 illustrates that, in one embodiment, decoding may include performing a error check on at least the payload portion, as described above. Block 610 illustrates that, in one embodiment, decoding may include performing 64B/65B decoding on at least part of the payload portion, as described above. In one embodiment, the optical receiver 416, GFP Frame deconstructor 414 or apparatus 400 of FIG. 4 may perform these actions, as described above.

Block 612 illustrates that, in one embodiment, extracting, from the GFP-T frame, indications of data stream signal failure may occur, as described above. Block 614 illustrates that, in one embodiment, extracting may include extracting a user payload identifier (UPI) from the GFP-T frame, as described above. Block 616 illustrates that, in one embodiment, the UPI may be divided into two bits per data stream, and one of the two bits indicates a loss of the respective data stream signal and the other bit indicates a loss of the respective data stream character synchronization, as described above. In one embodiment, the optical receiver 416, GFP Frame deconstructor 414 or apparatus 400 of FIG. 4 may perform these actions, as described above.

Block 650 illustrates that, in one embodiment, demultiplexing the combined data stream to create a plurality of data streams may occur, as described above. Block 652 illustrates that, in one embodiment, demultiplexing may include extracting a payload data portion from the GFP-T frame, as described above. Block 654 illustrates that, in one embodiment, demultiplexing may include byte-wise demultiplexing a payload data portion to produce the plurality of data streams, as described above. In one embodiment, the DeMUX 410, GFP Frame deconstructor 414 or apparatus 400 of FIG. 4 may perform these actions, as described above.

Block 656 illustrates that, in one embodiment, transmitting each of the data streams to a respective data stream receiver may occur, as described above. Block 658 illustrates that, in one embodiment, transmitting may include encoding the indications of data stream signal failure into Enterprise Systems Connection (ESCON) data streams, as described above. Block 660 illustrates that, in one embodiment, transmitting may include transmitting the ESCON data streams, as described above. In one embodiment, the queue 406 of FIG. 2 or apparatus 400 of FIG. 4 may perform these actions, as described above.

Block 662 illustrates that, in one embodiment, transmitting may include, for each data stream, buffering the data stream after the demultiplexing, as described above. Block 664 illustrates that, in one embodiment, transmitting may include, for each data stream, rate adapting the buffered data stream to a reference frequency, as described above. Block 666 illustrates that, in one embodiment, transmitting may include, for each data stream, 8B/10B encoding the buffered data stream, as described above. In one embodiment, the queue 406 of FIG. 2 or apparatus 400 of FIG. 4 may perform these actions, as described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An apparatus comprising:
a plurality of queues, wherein each queue is configured to receive a respective data stream and to monitor the respective data stream in order to detect a data stream signal failure;
a multiplexer configured to time division multiplex the data streams into a combined, interleaved data stream;
a Generic Framing Procedure-Transparent (GFP-T) frame constructor configured to create a GFP-T frame comprising a payload portion including: a payload data portion comprising a subsection of the combined data stream divided into equal subdivisions based upon the number of data streams, and a payload header portion including an indication of the occurrence of a data stream signal failure detected at the plurality of queues, and to divide a user payload identifier field of the payload header portion into two bits per data stream, wherein one of the two bits represents a loss of synchronization with the respective data stream, and the other bit represents a loss of signal with the respective data stream; and
a transmitter configured to transmit the GFP-T frame via an optical link.

2. The apparatus of claim 1 wherein the plurality of queues are each configured to receive data streams of Enterprise Systems Connection (ESCON) data.

3. The apparatus of claim 1 wherein the plurality of queues are each configured to receive data streams comprising data packets.

4. The apparatus of claim 1 wherein each of the plurality of queues includes:
a line interface unit configured to:
receive a stream of data;
decode the received data using a 8B/10B decoding scheme;
perform a Cyclic Redundancy Check (CRC) on the received data;
perform performance monitoring of the received data;
place the data in a First-In-First-Out (FIFO) queue; and
a FIFO queue configured to store data in a first-in-first-out fashion.

5. The apparatus of claim 4 wherein the line interface unit is configured to synchronize the stream of data to a common clock by either adding or deleting idle characters to the streams; and
wherein the FIFO queue is configured to place data into the queue at a first data rate, and remove data from the queue at a second data rate that is higher than the first data rate.

6. The apparatus of claim 5 wherein the plurality of queues includes four queues;
wherein the GFP-T payload portion includes 64 bytes; and
wherein the multiplexer is configured to byte-wise interleave the removed data; such that each queue is represented in the combined data stream sixteen times, once every fourth byte.

7. The apparatus of claim 1 wherein the multiplexer is configured to:
remove a portion, of predetermined size, of data from each queue in a round robin fashion;
interleave the removed data into a combined data stream, and
repeat the removal and interleaving of the portions until enough data has been removed from the queues to fill the GFP-T payload portion.

8. The apparatus of claim 1 wherein the GFP-T frame constructor is configured to:
receive the combined data stream;
encode the combined data stream using a 64B/65B encoding scheme;
encapsulate the combined data stream into a GFP-T payload data portion; and
create a payload header portion indicating the occurrence, or lack thereof, of a data stream signal failure detected at the plurality of queues.

9. A method comprising:
receiving, at a plurality of queues, a plurality of data streams, wherein each data stream is synchronized to a respective clock having a substantially equivalent frequency;
monitoring the plurality of data streams in order to detect an occurrence of a client signal failure that includes at least one of a loss of synchronization with a data stream and a loss of signal with a data stream;
clock rate compensating the plurality of data streams to a common clock;
time division multiplexing the plurality of data streams to create equally sized payload portions of at least one Generic Framing Procedure-Transparent (GFP-T) frame, wherein the GFP-T frame includes a payload portion having a payload header portion and a payload data portion that includes interleaved, combined data from the plurality of data streams, and wherein the amount of data in the payload portion from each data stream is based upon the number of the plurality data streams;
dividing a user payload identifier field of the payload header portion into two bits per data stream, wherein one of the two bits represents the loss of synchronization with the respective data stream, and the other bit represents a loss of signal with the respective data stream; and
transmitting the GFP-T frame via an optical link.

10. The method of claim 9 wherein receiving includes, for each data stream:
receiving a stream of data;
performing a 8B/10B decoding on the received data;
performing a Cyclic Redundancy Check (CRC) on the received data; and
placing the data in a First-In-First-Out (FIFO) queue.

11. The method of claim 9 wherein compensating includes:
synchronizing the plurality of data streams to a common clock by either adding or deleting idle characters to the streams; and
wherein the common clock includes a frequency substantially equivalent to the data stream clocks.

12. The method of claim 9 wherein multiplexing includes:
creating a GFP-T frame;
dividing the GFP-T frame payload data portion into equal subdivisions based upon the number of data streams;
removing a portion of data from each data stream in a round robin fashion;
byte-wise interleaving the removed portions of the data streams into the payload data portion; and
placing the GFP-T frame in a buffer for transmission.

13. The method of claim 12 wherein creating a GFP-T frame includes creating a 64-byte payload data portion; wherein the plurality of data streams includes 4 data streams;
wherein dividing includes allocating 16 bytes of the payload data portion to each of the four data streams; and
wherein interleaving includes interleaving the removed data such that each data stream is represented in the payload data portion every fourth byte.

14. The method of claim 9 wherein receiving includes receiving data streams from a plurality of different devices.

15. A method comprising:
receiving, via an optical link from an optical transmitting apparatus, a Generic Framing Procedure-Transparent (GFP-T) frame that includes a payload portion having equal subdivisions of portions of a plurality of data streams that are byte-wise interleaved;
decoding the received GFP-T frame into a combined data stream that includes the plurality of byte-wise interleaved data streams;
extracting a user payload identifier from the received GFP-T frame;
dividing the UPI into two bits per data stream, wherein one of the two bits indicates a loss of the respective data stream signal and the other bit indicates a loss of the respective data stream character synchronization;
demultiplexing the combined data stream to create a plurality of data streams; and
transmitting each of the data streams to a respective data stream receiver.

16. An apparatus comprising:
an optical receiver configured to receive, from an optical transmitting apparatus, a Generic Framing Procedure-Transparent (GFP-T) frame that includes a payload portion having equal subdivisions of portions of a plurality of data streams that are byte-wise interleaved;
a Generic Framing Procedure-Transparent (GFP-T) frame deconstructor configured to:
extract a payload portion from the received GFP-T frame, wherein the payload portion includes a plurality of byte-wise interleaved data streams, and
extract a user payload identifier field from the payload portion of the received GFP-T frame;
divide the UPI field into two bits per data stream, wherein one of the two bits represents a loss of synchronization with the respective data stream, and the other bit represents a loss of signal with the respective data stream;
a demultiplexer configured to divide the payload portion into a plurality of data streams; and
a plurality of queues configured to buffer and output the plurality of data streams.

* * * * *